(No Model.) 2 Sheets—Sheet 1.
J. H. WHITAKER.
HARNESS.
No. 466,109. Patented Dec. 29, 1891.
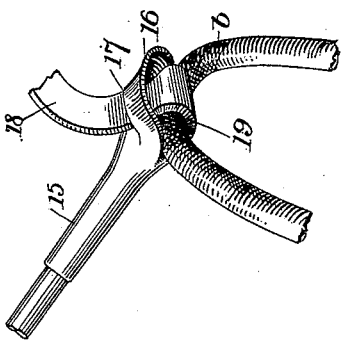
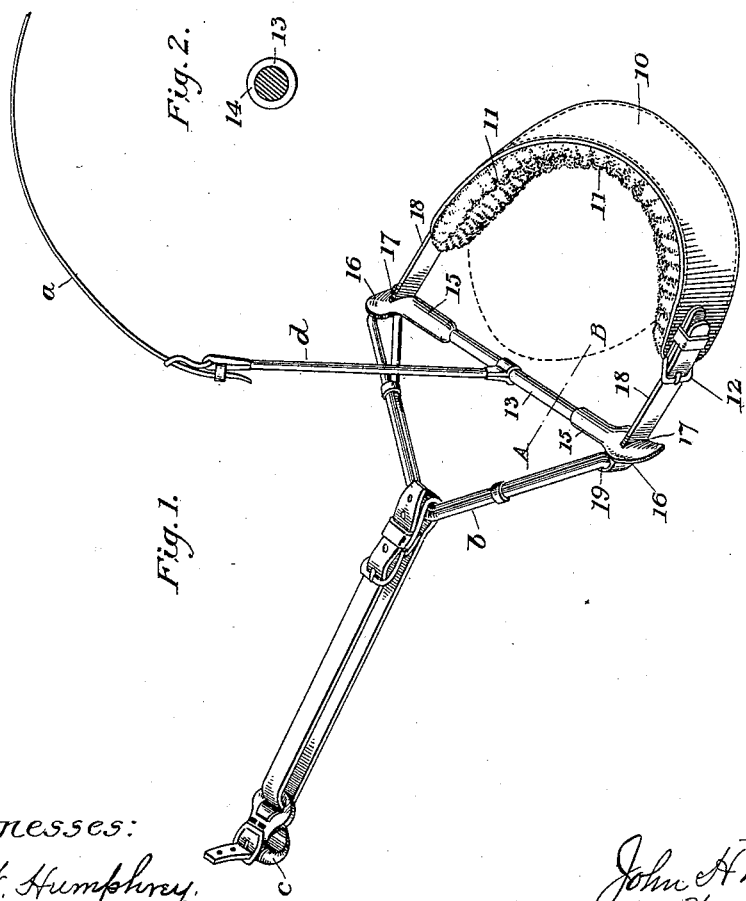
Witnesses:
W. W. Humphrey.
C. R. McCandless.
Inventor:
John H. Whitaker
per Wm. K. White
Attorney.

(No Model.)   J. H. WHITAKER.   2 Sheets—Sheet 2.
HARNESS.

No. 466,109.   Patented Dec. 29, 1891.

Witnesses:
W. H. Humphrey.
W. D. Pearne.

Inventor:
John H Whitaker
per Wm K White
Attorney.

United States Patent Office.

JOHN H. WHITAKER, OF DAVENPORT, IOWA.

HARNESS.

SPECIFICATION forming part of Letters Patent No. 466,109, dated December 29, 1891.

Application filed October 22, 1890. Serial No. 368,992. (No model.)

*To all whom it may concern:*

Be it known that I, JOHN H. WHITAKER, a citizen of the United States, residing at Davenport, in the county of Scott and State of Iowa, have invented a new and useful Improvement in Shackles, of which the following is a specification.

The object of my invention is to provide shackles to be used in harness attachments for causing trotting horses to spread apart their hind legs, so as to step with the hind feet outside of the line of travel of the fore feet, so constructed as to prevent irritation of the horse's legs; also, to permit sufficient movement to accommodate itself to the movements of the harness attachment to which it is connected.

My improvement is more especially intended to be used in connection with my trotting-harness for which Letters Patent were granted me February 7, 1888, No. 377,727, as a substitute for the shackle therein described; but it may be used in any other harness where shackles are used. I accomplish these objects by the mechanism illustrated in the accompanying drawings, in which—

Figure 4:
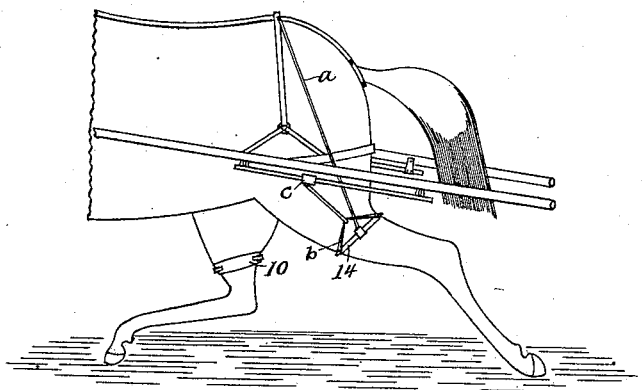
Figure 5:
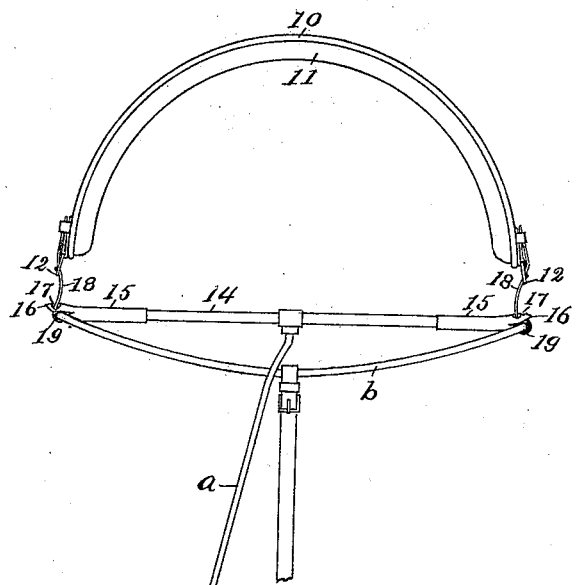

Figure 1 is a perspective view of my shackle. Fig. 2 is a cross-section of the covered rigid rod, taken on the line A B in Fig. 1. Fig. 3 is a view of one end of the rigid rod, showing its connection with the padded portion of the shackle. Fig. 4 is a side view showing the application of my device to a horse, and Fig. 5 is a plan view of the shackle.

Similar letters and figures refer to similar parts throughout the several views.

The shackle consists of a flexible strap of leather or other suitable material 10, preferably padded upon its inner sides, as at 11, the ends of such strap being provided with buckles 12. A rigid rod of wood or other suitable material 13 is covered with leather or other suitable material 14, the ends of which are encompassed by another covering, preferably leather 15, the end of which covering is slit so as to form a flap 16, which flap is perforated crosswise, as at 17, and the other side of such covering, where slit, forms the end strap 18. The end strap 18 is passed through the perforation 17 of the flap 16, so as to leave a loop 19, and such strap is passed rearward and connected with the strap 10 by the buckle 12. This construction of the shackle enables it to be easily attached to the harness and easily adjusted, and especially the harness described in my Letters Patent already referred to, and for the purpose of explaining such attachment I have shown certain parts of the harness in the drawings.

The sliding sleeve $c$, with its strap, is attached to the elastic cord $b$, and which cord passes through the loops 19 of the strap 18, thus securing the sliding sleeve and strap to the shackle. This sliding sleeve, with its strap, is fully described in my Letters Patent heretofore referred to.

The shackle is supported on the animal's limb by a strap $a$, which strap may be attached to the breeching, as described in my Letters Patent heretofore referred to, or such strap may pass over the animal's back and be secured in position by being attached to the back-strap of the harness, and such strap may be in part an elastic cord, as at $d$. The lower end of the strap $a$ is secured to the rod 13 around its covering 14. I have not illustrated the harness complete, as my invention is only intended to cover the shackle, and the harness is fully described in my said Letters Patent heretofore referred to.

The position of the animal's limb is illustrated by the dotted lines in Fig. 1 when such limb is encompassed by the shackle.

I am aware that in Letters Patent No. 59,178, October 30, 1866, for an upper-jaw bit, there is described, with an ordinary bridle and bit, an auxiliary bit fastened by a nose-strap to the upper jaw of the animal and buckled to the gag bearing-rein. My device, however, is limited to limb-shackles.

From the description here given the construction and mode of operation of my shackle will be readily understood, and it will also be seen that many changes and modifications can be made without departing from the scope of my invention.

What I claim as new, and desire to secure by Letters Patent, is—

In a shackle, the combination of the flexible strap, the buckles attached at the respective ends of said flexible strap, the rigid covered rod, the straps attached to the respective ends of said rod, the perforated flaps attached to the respective ends of said rod, the loop at each end of said rod, formed by passing the strap through the perforation in the flap, the elastic cord passing through and secured in such loops, the means for supporting the shackle upon the animal's limb, and means for securing it to a device for spreading the hind limbs of the animal, substantially as described.

JOHN H. WHITAKER.

Witnesses:
GEO. E. GOULD,
JNO. M. HELMICK.